(12) United States Patent
Lin

(10) Patent No.: US 11,788,611 B1
(45) Date of Patent: Oct. 17, 2023

(54) ACTUATOR WITH WORM GEAR POSITIONING MECHANISM

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/107,001

(22) Filed: Feb. 7, 2023

(30) Foreign Application Priority Data

Dec. 15, 2022 (TW) .................................. 111213867

(51) Int. Cl.
*F16H 25/24* (2006.01)
*F16H 25/20* (2006.01)

(52) U.S. Cl.
CPC ... *F16H 25/2454* (2013.01); *F16H 2025/209* (2013.01); *F16H 2025/2031* (2013.01); *F16H 2025/2084* (2013.01)

(58) Field of Classification Search
CPC ......... F16H 25/2454; F16H 2025/2031; F16H 2025/2084; F16H 2025/209
See application file for complete search history.

(56) References Cited

U.S. PATENT DOCUMENTS

| 8,210,064 | B2 * | 7/2012 | Ku | B66F 3/08 |
| | | | | 74/89.38 |
| 2008/0210029 | A1 * | 9/2008 | Wang | F16H 25/20 |
| | | | | 74/89.38 |
| 2012/0096963 | A1 * | 4/2012 | Hung | F16H 25/2454 |
| | | | | 74/89.38 |
| 2014/0312724 | A1 * | 10/2014 | Hung | H02K 7/06 |
| | | | | 310/78 |
| 2018/0238426 | A1 * | 8/2018 | Hung | F16H 25/2454 |
| 2022/0112940 | A1 * | 4/2022 | Keller | F16H 25/2252 |
| 2022/0324507 | A1 * | 10/2022 | Major | B62D 5/0448 |

FOREIGN PATENT DOCUMENTS

| CN | 115126825 A * | 9/2022 | ........... B60N 2/0232 |
| DE | 60112597 T2 | 6/2006 | |
| DE | 102013108031 B4 | 8/2017 | |
| DE | 102022114310 A1 | 2/2023 | |
| WO | WO-2018040284 A1 * | 3/2018 | .............. F16D 11/04 |

OTHER PUBLICATIONS

Office Action dated Jul. 27, 2023 of the corresponding German patent application No. 102023108760.6.

* cited by examiner

*Primary Examiner* — Zakaria Elahmadi
(74) *Attorney, Agent, or Firm* — Chun-Ming Shih; HDLS IPR SERVICES

(57) ABSTRACT

An actuator with a worm gear positioning mechanism, which includes: a shell casing (10); a motor (20) having a worm rod (21); a transmission assembly (30) having a guiding screw rod (31), a worm gear (32) and a bearing (33), the worm gear (32) having an annular member (321) having an inner circumferential surface (322); an outer tube (40) having an outer circumferential surface (41) attached to the inner circumferential surface (322), the worm gear (32) being positioned between the worm rod (21) and the outer tube (40) on a radial direction; and a telescopic tube (50) disposed in the outer tube (40) and having an inner tube (51) and a screw nut (52), the screw nut (52) moveably screwed with the guiding screw rod (31) to make the inner tube (51) linearly movable relative to the outer tube (40).

10 Claims, 6 Drawing Sheets

ACTUATOR WITH WORM GEAR POSITIONING MECHANISM

BACKGROUND OF THE DISCLOSURE

Technical Field

The present disclosure relates to an actuator, especially to an actuator with a worm gear positioning mechanism.

Description of Related Art

An actuator may be actuated without being driven via gas or liquid, and have advantages of compact volume, low noise generated during operation and low pollution to the ambient environment. Thus, the actuator is commonly used in different fields, for example house, industrial location, medical facility, and farming area.

A transmission assembly of the related-art actuator mainly includes a guiding screw rod, a worm gear, a rear bearing and a positioning bearing. The worm gear, the rear bearing and the positioning bearing are sequentially disposed on the guiding screw rod, and the worm gear is disposed between the rear bearing and the positioning bearing. The guiding screw rod and the worm gear are supported in a shell casing through the rear bearing and the positioning bearing.

However, the installation cost of the positioning bearing is an issue for a long time. Some suppliers utilize the low-cost and low-quality positioning bearing for replacement; thus, the service life of the actuator is greatly shortened. Other suppliers may directly save the cost by not installing the positioning bearing, thus the stability of the guiding screw rod during operation is poor.

Accordingly, the applicant of the present disclosure has devoted himself for improving the mentioned shortages.

SUMMARY OF THE DISCLOSURE

The present disclosure is to provide an actuator with a worm gear positioning mechanism, in which a worm gear is radially positioned, thus the installation cost of a positioning bearing is saved, the operation is stable, and the internal structure is compact.

Accordingly, the present disclosure provides an actuator with a worm gear positioning mechanism, which includes a shell casing, a motor, a transmission assembly, an outer tube, and a telescopic tube. The motor is disposed in the shell casing and has a worm rod. A part of the transmission assembly is disposed in the shell casing. The transmission assembly has a guiding screw rod, a worm gear and a bearing. The bearing is disposed at one end of the guiding screw rod to support the guiding screw rod in the shell casing. The worm gear is adapted to sheathe the guiding screw rod and engaged with the worm rod for transmissions. The worm gear has an annular member. The annular member has an inner circumferential surface. A part of the outer tube is fastened in the shell casing. One end of the outer tube has an outer circumferential surface attached to the inner circumferential surface. The worm gear is positioned between the worm rod and the outer tube on a radial direction. The telescopic tube is disposed in the outer tube and has an inner tube and a screw nut connected to the inner tube. The screw nut is moveably screwed with the guiding screw rod to make the inner tube linearly movable relative to the outer tube.

Advantages achieved by the present disclosure are as follows. With each positioning column and each penetrated hole being mutually engaged and fastened, the outer tube is stably fastened in the shell casing. Through the worm gear being connected to the outer tube, the operation of the guiding screw rod is more reliable. Through each brake component being fastened tightly with each convex column, a torsion spring is driven to generate a radial compression to achieve a braking effect. Through each seal ring being disposed, internal electric components are prevented from being affected by moisture and protected from being damaged.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

Figure 1:
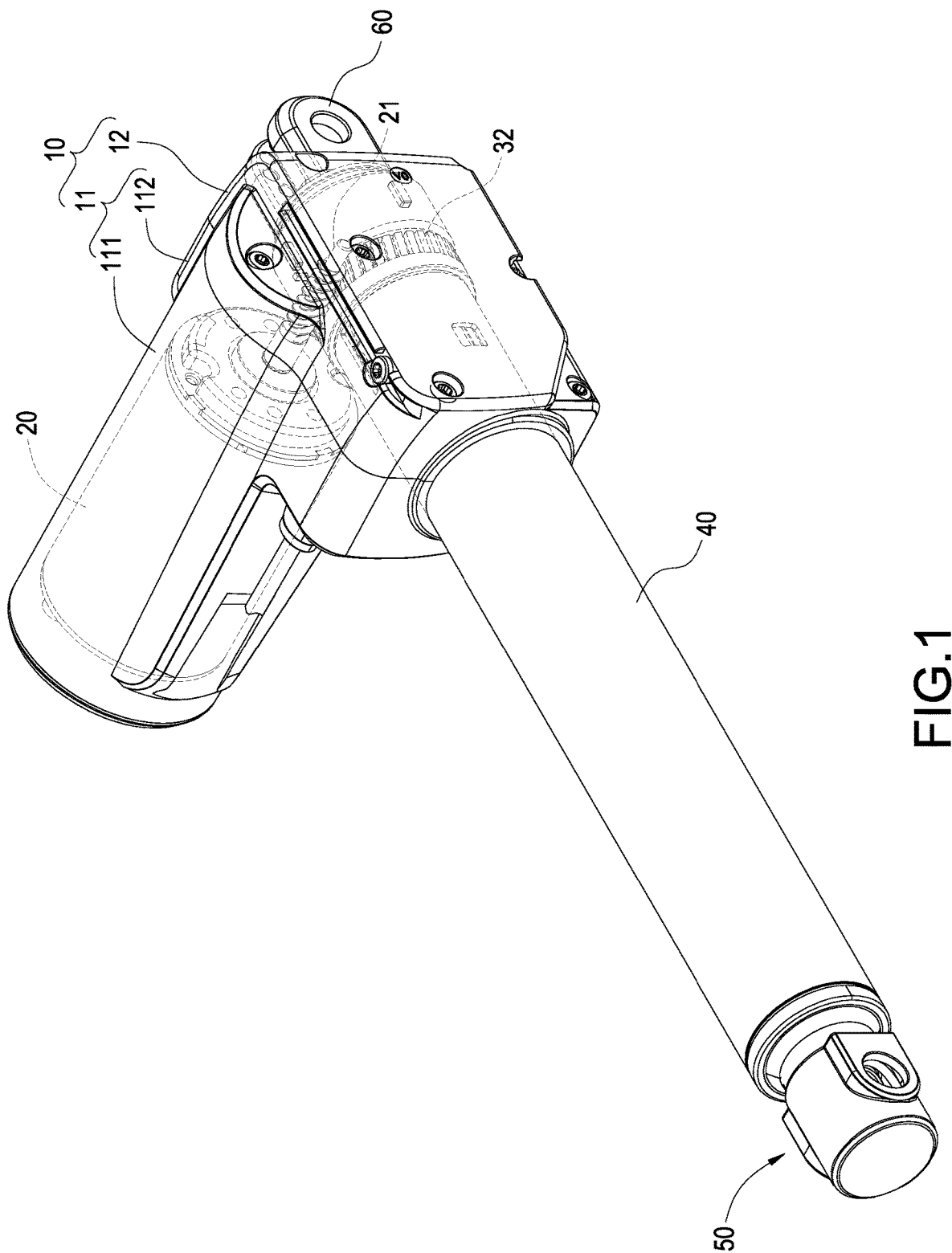
FIG. 1 is a schematic view showing the assembly of the actuator with a worm gear positioning mechanism according to the present disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer from FIG. 1 to FIG. 6, the present disclosure provides an actuator with a worm gear positioning mechanism, which includes a shell casing 10, a motor 20, a transmission assembly 30, an outer tube 40, a telescopic tube 50.

Figure 2:
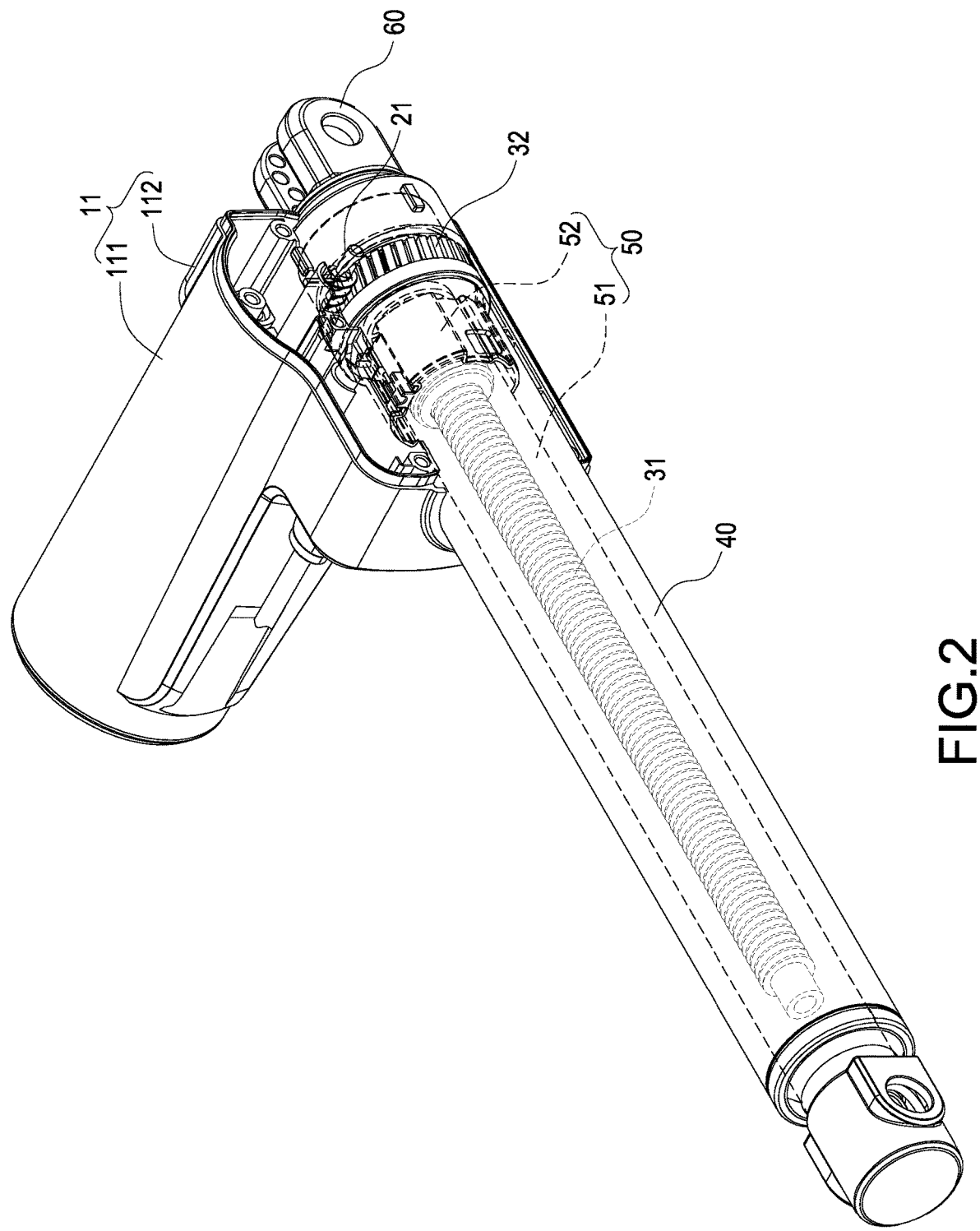
FIG. 2 is a perspective view showing the assembly of the actuator with a worm gear positioning mechanism according to the present disclosure.
Figure 3:
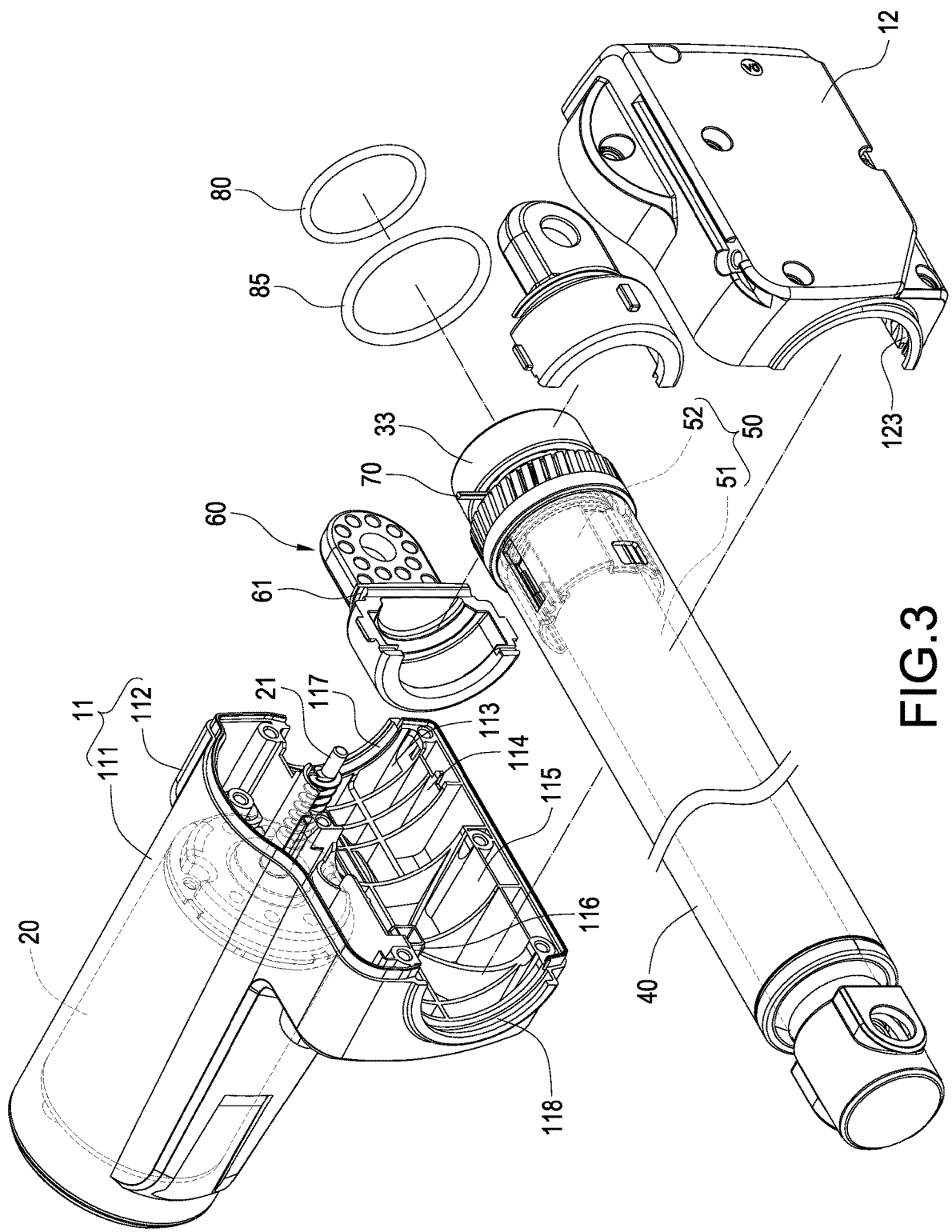
FIG. 3 is an exploded view showing the transmission assembly and the outer tube according to the present disclosure.
Figure 4:
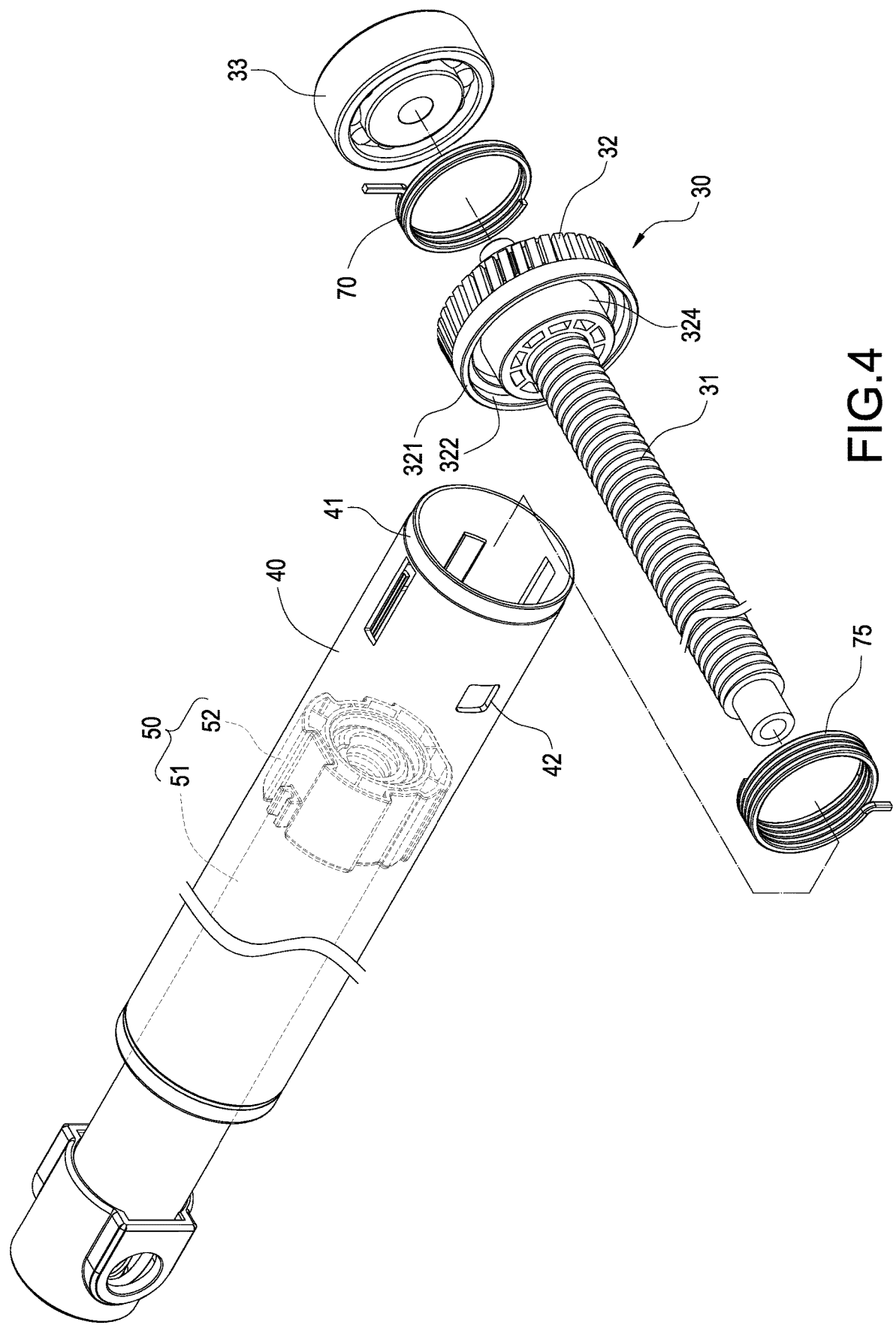
FIG. 4 is an exploded view showing the actuator with a worm gear positioning mechanism according to the present disclosure.
Figure 5:
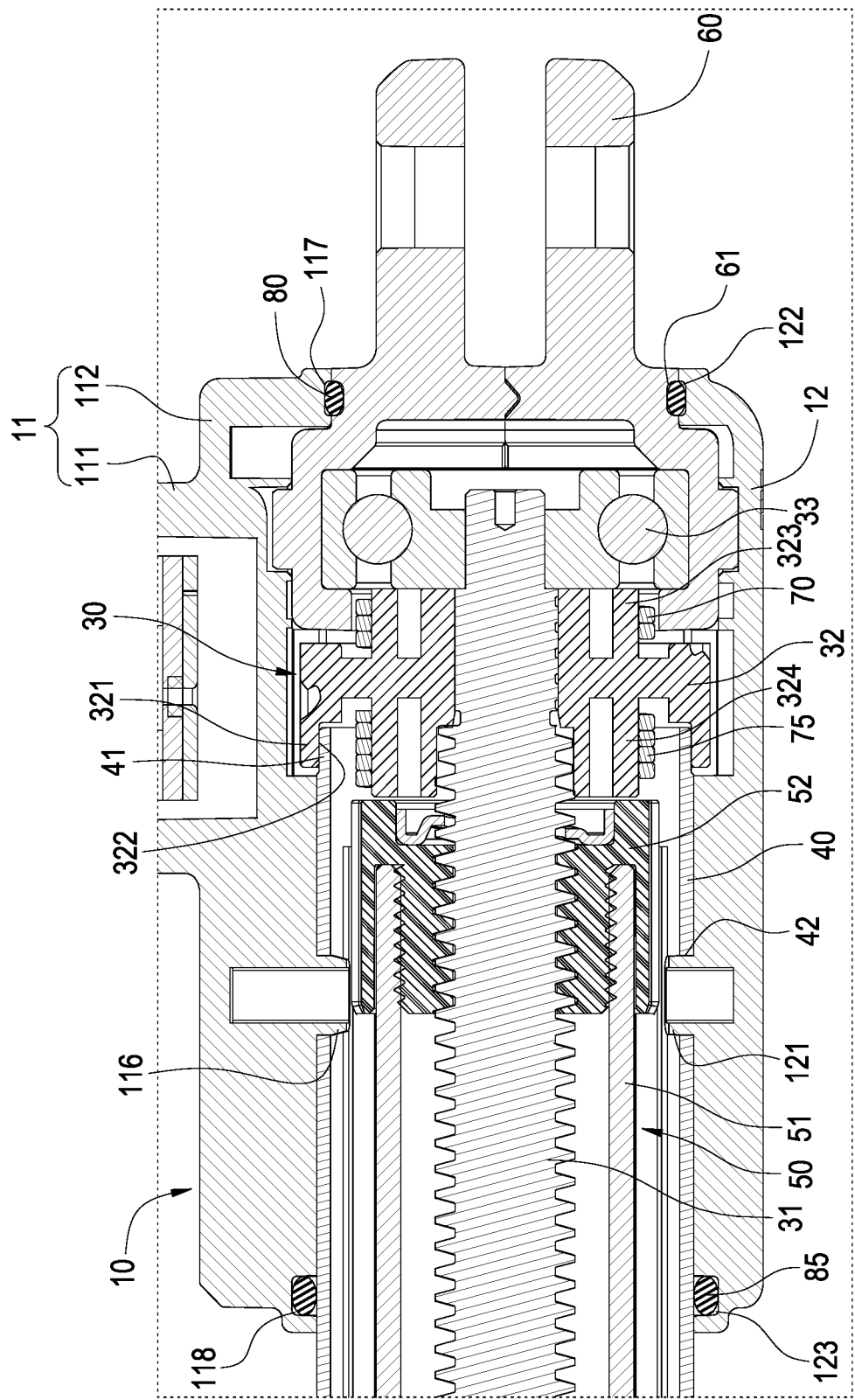
FIG. 5 is a cross sectional view showing the assembled actuator with a worm gear positioning mechanism according to the present disclosure.
Figure 6:
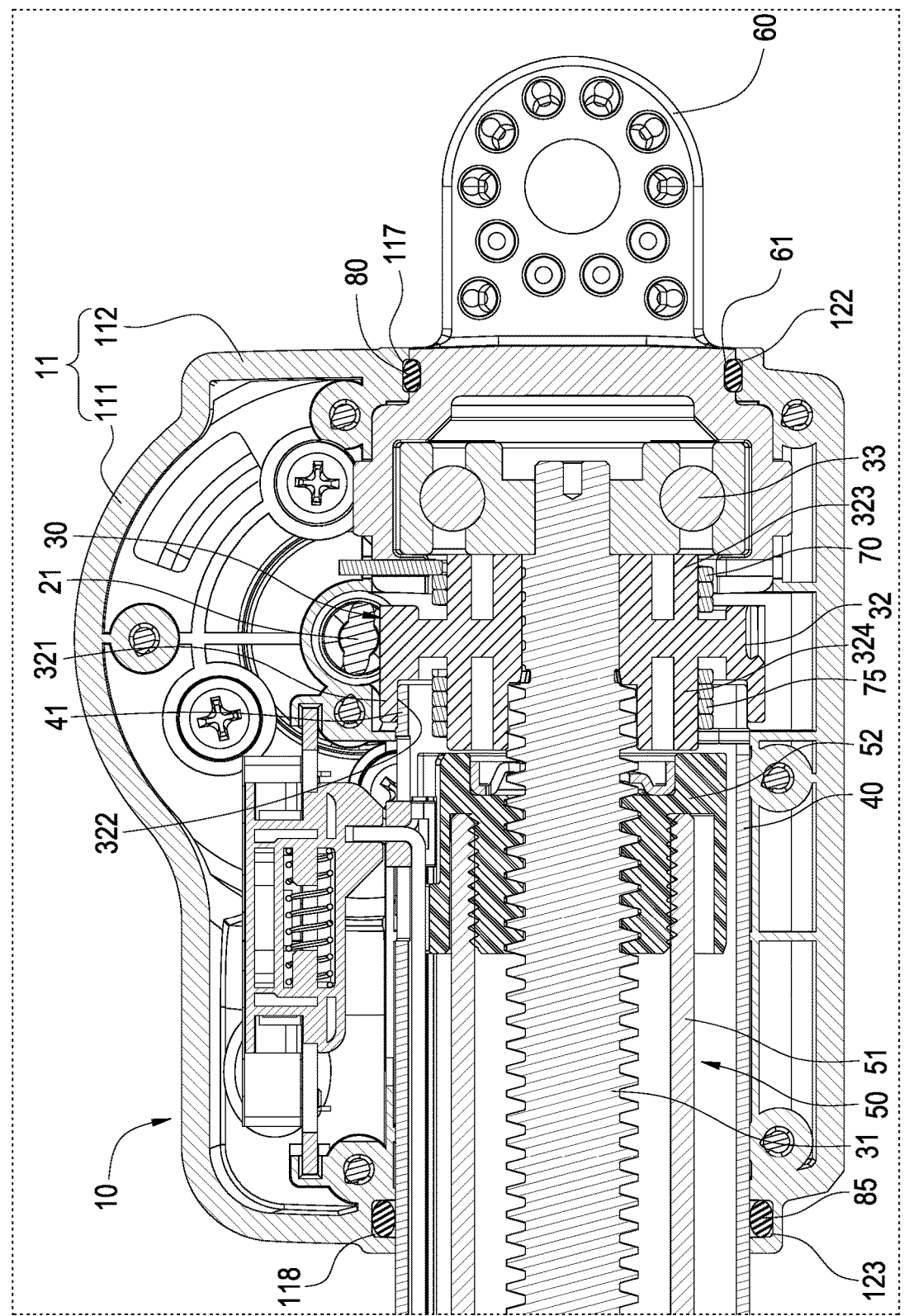
FIG. 6 is another cross-sectional view showing the assembled actuator with a worm gear positioning mechanism according to the present disclosure.

As shown in FIG. 1, FIG. 2 and FIG. 3, the shell casing 10 is made of a material for example a plastic or an alloy material. The shell casing 10 mainly includes a lower casing member 11 and an upper casing member 12. The lower casing member 11 has a tubular housing 111 and a base 112 extended from the tubular housing 111. A first accommodation zone 113, a second accommodation zone 114 and a third accommodation zone 115 are sequentially formed from right to left in the base 112. A lower positioning column 116 extended from the base 112 is disposed at a middle location of the third accommodation zone 115. The upper casing member 12 is correspondingly engaged with the base 112 of the lower casing member 11. An upper positioning column 121 corresponding to the lower positioning column 116 is extended from the upper casing member 12.

In some embodiments, a first semi-circular recess 117 is formed at a head end of the base 112 and a second semi-circular recess 122 corresponding to the first semi-circular recess 117 is formed on the upper casing member 12 to jointly define a circular recess. In addition, a third semi-circular recess 118 is formed at a distal end of the base 112 and a fourth semi-circular recess 123 corresponding to the third semi-circular recess 118 is formed on the upper casing member 12 to jointly define another circular recess.

The motor 20 is an electric motor capable of generating forward and reverse rotations. The motor 20 is disposed in the tubular housing 111 of the shell casing 10. The motor 20 includes a worm rod 21. The worm rod 21 is formed in the second accommodation zone 114 of the base 112.

Please refer from FIG. 3 to FIG. 6, a part of the transmission assembly 30 is disposed in the first accommodation zone 113 and the second accommodation zone 114 of the shell casing 10, another part of the transmission assembly 30 is extended in a direction away from the shell casing 10. The transmission assembly 30 mainly includes a guiding screw rod 31, a worm gear 32 and a bearing 33. The bearing 33 is disposed at one end of the guiding screw rod 31, and the guiding screw rod 31 is supported via the base 112 of the shell casing 10. The worm gear 32 sheathe the guiding screw rod 31 and is mutually engaged with the worm rod 21 for transmissions. The worm gear 32 moves with the guiding screw rod 31. Apart from having a gear part, the worm gear 32 further has a ring member 321. The ring member 321 is extended from one side of the gear part. As such, the whole structural strength of the worm gear 32 is increased. The ring member 321 has an inner circumferential surface 322. A first convex column 323 and a second convex column 324 are extended from two sides of an axial core of the worm gear 32. The second convex column 324 is extended from the worm gear 32 in a direction away from the first convex column 323.

A part of the outer pipe 40 is fastened in third accommodation zone 115 of the shell casing 10, another part of the outer pipe 40 is extended in a direction away from the shell casing 10. One end of the outer tube 40 has an outer circumferential surface 41 attached to the inner circumferential surface 322 of the ring member 321, thus the worm gear 32 is positioned between the worm rod 21 and the outer tube 40 on the radial direction. The outer tube 40 has two penetrated holes 42 located in the third accommodation zone 115. One of the penetrated holes 42 is arranged corresponding to the lower positioning column 116 to be mutually engaged and fastened. The other penetrated hole 42 is arranged corresponding to the upper positioning column 121 to be mutually engaged and fastened.

The telescopic tube 50 is disposed in the outer tube 40. The telescopic tube 50 mainly has an inner tube 51 and a screw nut 52 connected to the inner tube 51. The screw nut 52 is moveably screwed with the guiding screw rod 31 to make the inner tube 51 be capable of moving linearly of extraction or retraction relative to the outer tube 40.

In some embodiments, the actuator with the worm gear 32 positioning mechanism of the present disclosure further includes a rear supporter 60. The rear supporter 60 covers the bearing 33 and is jointly disposed in the first accommodation zone 113 of the base 112. The rear supporter 60 has an annular mounting slot 61.

In some embodiments, the actuator with the worm gear 32 positioning mechanism of the present disclosure further includes a first brake component 70 and a second brake component 75. The first brake component 70 is annularly and tightly disposed on an outer surface of the first convex column 323, and one end thereof is fastened on the rear supporter 60. The second brake component 75 is annularly and tightly disposed on an outer surface of the second convex column 324, and one end thereof is fastened on the outer tube 40. In some embodiments, the first brake component 70 and the second brake component 75 are a torsion spring. Through the first convex column 323 and the second convex column 324 rotating, the torsion spring is driven to generate a radial compression to achieve a braking effect.

In some embodiments, the actuator with the worm gear 32 positioning mechanism of the present disclosure further includes a first seal ring 80 and a second seal ring 85. The first seal ring 80 is disposed in the second semi-circular recess 117, the second semi-circular recess 122 and the annular mounting slot 61. The second seal ring 85 sheathes an outer surface of the outer tube 40 and is disposed in the third semi-circular recess 118 and the fourth semi-circular recess 123.

While this disclosure has been described by means of specific embodiments, numerous modifications and variations could be made thereto by those skilled in the art without departing from the scope and spirit of this disclosure set forth in the claims.

What is claimed is:

1. An actuator with a worm gear positioning mechanism, the actuator comprising:
   a shell casing (10);
   a motor (20), disposed in the shell casing (10) and comprising a worm rod (21);
   a transmission assembly (30), partly disposed in the shell casing (10) and comprising a guiding screw rod (31), a worm gear (32) and a bearing (33), the bearing (33) adapted to sheathe one end of the guiding screw rod (31) to support the guiding screw rod (31) on the shell casing (10), the worm gear (32) adapted to sheathe the guiding screw rod (31) and engaged with the worm rod (21), the worm gear (32) comprising an annular member (321), and the annular member (321) comprising an inner circumferential surface (322);
   an outer tube (40), partly fastened in the shell casing (10), and comprising an outer circumferential surface (41) disposed on one end thereof and directly attached to the inner circumferential surface (322), wherein the worm gear (32) is positioned between the worm rod (21) and the outer tube (40) on a radial direction; and
   a telescopic tube (50), disposed in the outer tube (40) and comprising an inner tube (51) and a screw nut (52) connected to the inner tube (51), the screw nut (52) moveably screwed with the guiding screw rod (31) to make the inner tube (51) linearly movable relative to the outer tube (40).

2. The actuator according to claim 1, further comprising a rear supporter (60), partly covering the bearing (33) to be collectively accommodated in the shell casing (10).

3. The actuator according to claim 2, further comprising a first brake component (70), the worm gear (32) comprising a first convex column (323) extended therefrom, wherein the first brake component (70) is annularly disposed on the first convex column (323), and one end of the first brake component (70) is fastened on the rear supporter (60).

4. The actuator according to claim 3, further comprising a second brake component (75), the worm gear (32) comprising a second convex column (324) extended therefrom in a direction opposite to the first convex column (323), wherein the second brake component (75) is annularly disposed on the second convex column (324), and one end of the second brake component (75) is fastened on the outer tube (40).

5. The actuator according to claim 2, further comprising a first seal ring (80), the shell casing (10) comprising a lower casing member (11) and an upper casing member (12) correspondingly engaged with the lower casing member (11), the lower casing member (11) comprising a first semi-circular recess (117), the upper casing member (12) comprising a second semi-circular recess (122) corresponding to the first semi-circular recess (117), and the rear supporter (60) comprising an annular mounting slot (61), wherein the first seal ring (80) is disposed in the first semi-circular recess (117), the second semi-circular recess (122) and the annular mounting slot (61).

6. The actuator according to claim 5, further comprising a second seal ring (85), the lower casing member (11) comprising a third semi-circular recess (118), and the upper casing member (12) comprising a fourth semi-circular recess (123) corresponding to the third semi-circular recess (118), wherein the second seal ring (85) is adapted to sheathe the outer tube (40) and disposed in the third semi-circular recess (118) and the fourth semi-circular recess (123).

7. The actuator according to claim 1, wherein the shell casing (10) comprises a lower casing member (11) and an upper casing member (12) correspondingly engaged with the lower casing member (11), the lower casing member (11) comprises a tubular housing (111) and a base (112) extended from the tubular housing (111), and the motor (20) is partly disposed in the tubular housing (111).

8. The actuator according to claim 7, wherein a first accommodation zone (113), a second accommodation zone (114) and a third accommodation zone (115) are sequentially defined in the base (112), the bearing (33) is disposed in the first accommodation zone (113), the worm gear (32) is disposed in the second accommodation zone (114), and the outer tube (40) is partly disposed in the third accommodation zone (115).

9. The actuator according to claim 8, wherein the base (112) comprises a lower positioning column (116) extended therefrom in the third accommodation zone (115), the upper casing member (12) comprises an upper positioning column (121) extended therefrom corresponding to the lower positioning column (116), the outer tube (40) comprises a plurality of penetrated holes (42) located in the third accommodation zone (115) of the base (112), and the penetrated holes (42) are arranged corresponding to the lower positioning column (116) and the upper positioning column (121) to be mutually engaged and fastened.

10. The actuator according to claim 1, wherein the shell casing (10) comprises a lower casing member (11) and an upper casing member (12) correspondingly engaged with the lower casing member (11), the lower casing member (11) comprises a lower positioning column (116) extended therefrom, the upper casing member (12) comprises an upper positioning column (121) extended therefrom corresponding to the lower positioning column (116), the outer tube (40) comprises a plurality of penetrated holes (42) located in the shell casing (10), and the penetrated holes (42) are arranged corresponding to the lower positioning column (116) and the upper positioning column (121) to be mutually engaged and fastened.

\* \* \* \* \*